2,994,051
DISPLACEMENT MEASURING DEVICES

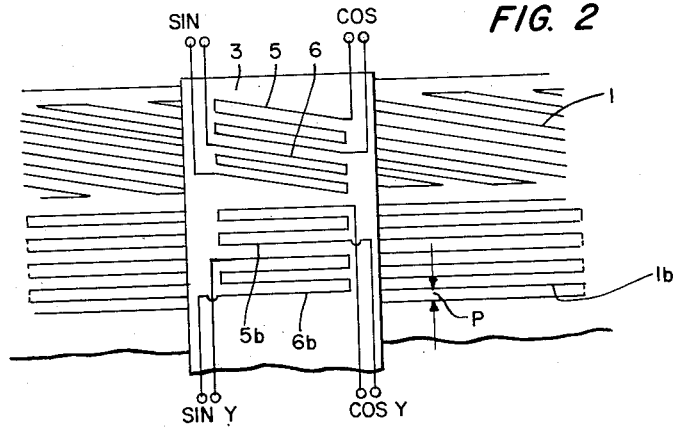
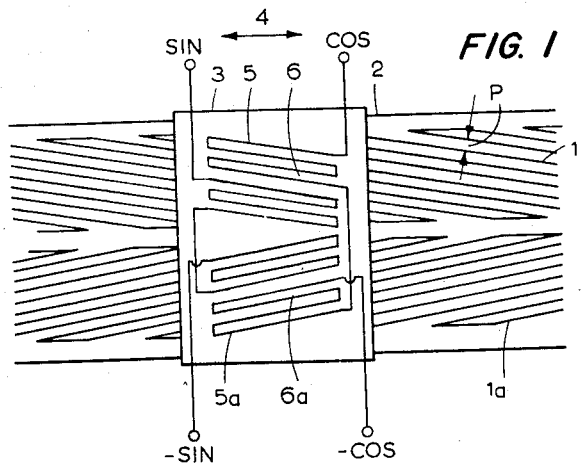

Rolf Edmund Spencer, West Ealing, London, and Roger Voles, Chiswick, London, England, assignors to Electric & Musical Industries Limited, Hayes, Middlesex, England, a company of Great Britain
Filed July 15, 1957, Ser. No. 672,076
Claims priority, application Great Britain July 18, 1956
3 Claims. (Cl. 336—115)

This invention relates to displacement measuring devices which are especially suitable for accurate positioning in automatic control arrangements.

A displacement measuring device has been proposed for measuring relative displacement between two parts for example the base of a machine tool and a slide mounted thereon, and comprising a long flat conductor on a glass or other insulating plate, which may be termed the scale, mounted (say) on the base, and two other conductors on a cursor plate attached to the slide. The long scale conductor consists of parallel equidistant strips normal to the direction of the relative displacement to be measured, each strip (other than the first and last) being connected at one end to the preceding strip and at the other end to the succeeding strip so that the conductor has a zig-zag configuration and electric current, when it flows therein, traverses successive strips in opposite directions. The cursor plate is parallel and close to the plane of the scale and the cursor conductors are each similar to but shorter than the scale conductor. Moreover the cursor conductors are arranged so that the strips of the one are displaced relatively to the corresponding strips of the other by $(n+\frac{1}{4})\lambda$, where $n$ is zero or an integer and $\lambda$ is twice the normal spacing of adjacent strips of the scale conductor. The cursor conductors, however, do not necessarily have the same pitch as the scale conductor. When alternating current flows in the scale conductor, electro-motive forces are induced across the cursor conductors the envelopes of which are in phase quadrature relationship, like the electro-motive forces induced in the quadrature rotor windings of a resolver magslip and as relative displacement occurs between the scale and the cursor, outputs can be derived from the cursor conductors which, suitably combined, give an indication of the relative displacement as a fraction of one pitch of the cursor conductors, the indication repeating itself for each pitch.

The arrangement illustrated can be used to give very accurate indications of relative displacements but in many applications an auxiliary measuring device is required to obtain an indication of the coarse location of the cursor.

According to the present invention there is provided a displacement measuring device comprising a scale having a series of conductive strips disposed side by side and connected for current flow in opposite directions in successive strips, a cursor mounted parallel and in proximity to said scale for relative displacement between said scale and said cursor in a predetermined direction, said cursor having at least one series of conductive strips substantially parallel to the strips on the scale and connected for current flow in opposite directions in successive strips, whereby electrical signals can be transferred from one series of strips to the other with an amplitude ratio responsive to relative displacement between the scale and the cursor in said direction, and wherein said conductive strips on both the scale and the cursor are similarly oblique to said direction.

By virtue of the obliquity of the strips of the conductors, a cycle of variation of said amplitude ratio corresponds to a greater relative displacement between cursor and scale than could be the case if the strips be normal to the direction of relative displacement. Therefore the effect is produced of gearing down the relative displacement to obtain a coarse indication thereof. Further, for a cursor of given overall size, the loss of sensitivity which would otherwise occur by increasing the separation of the strips in the direction of relative displacement in order to provide a coarse indication is substantially countered by the increased length which the strips may have by reason of their inclination.

In order that the invention may be clearly understood and readily carried into effect, the invention will be described with reference to the accompanying drawing in which:

FIGURE 1 illustrates part of a displacement measuring device according to one example of the invention,
FIGURE 2 illustrates a modification of FIGURE 1.

The device illustrated in the drawing comprises a long conductor 1 adhering to a scale 2 which may for example be secured to the base of a machine tool. The scale 2 may be glass plate and the conductor 1 may be applied to the plate by a silver etching process. A cursor plate 3 is mounted in a plane parallel to the scale 2 and it will be assumed that it is attached to a slide of the machine tool so that when the slide is displaced, relative displacement occurs between the scale 2 and cursor 3 in either direction of the arrow 4. The scale conductor 1 comprises parallel conducting strips joined at one end to the preceding strip and at the other end to the succeeding strip and is thus of zig-zag configuration and on the operation of the device alternating current is passed through the conductor 1. When this occurs, the current at any instant flows in opposite directions in alternate strips. The cursor 3 carries two relatively short conductors 5 and 6 each composed of strips parallel to the strips of the conductor 1 but not necessarily spaced by the same distance.

Corresponding strips of the conductors 5 and 6 are however displaced relative to each other by one-quarter $\lambda$ (or an integer plus a quarter) $\lambda$ where $\lambda$ is twice the normal spacing of adjacent strips of the scale conductor, this spacing being denoted by the distance $p$ in the drawing. Therefore when the current flows in the conductor 1, currents tend to be induced by electromagnetic induction in the conductors 5 and 6 the envelopes of which are in phase quadrature relationship. The conductors 5 and 6 therefore are referred to as cosine and sine windings respectively. It is apparent in the drawing that the strips of the conductors 1, 5 and 6 are parallel one to another and oblique to the direction of the relative displacement to be measured and as relative movement occurs the amplitudes of the electromotive forces induced in the conductors 5 and 6 will vary, relative to the amplitude of the current in the scale conductor 1, in a cyclic manner. For example one half cycle of variation of an output of the cosine conductor corresponds to a relative displacement $p$ of the conductors 1 and 5. The same is true of the sine conductor. However by virtue of the fact that the strips are oblique, one cycle of variations corresponds to a displacement of $2p$ secant $\theta$ where $\theta$ is the angle through which the strips have been turned from the normal to the direction of relative displacement. Therefore the equivalent of a gear-down ratio of secant $\theta$ is produced.

The device so far described is sensitive to relative sidelash between the scale 2 and the cursor 3. This effect, which is liable to give rise to significant error, may be overcome by printing another scale conductor 1a alongside the conductor 1 and equally and oppositely inclined as the conductor 1, and by printing other cosine and sine conductors 5a and 6a on the cursor 3 alongside the windings 5 and 6, so that the conductors 5a and 6a have the same disposition relative to the conductor 1a as the conductors 5 and 6 have to the conductor 1. The cursor conductors 5 and 5a, and 6 and 6a are in the same phase and are connected in series, and as they are back-to-back (that is oppositely inclined) the error due to sidelash in the two pairs of cursor windings are mutually cancelling.

The conductors of the coarse measuring devices illustrated can be printed alongside or attached to the conductors of another measuring device having the conducting strips normal to the relative movement and employed for indicating fine displacement. Moreover several coarse measuring devices of various "gear-down" ratios may be employed, printed on the same plate and cursor. In this case the adverse effect of sidelash may be reduced by using a common sidelash detecting device. Such a device may, as shown in FIGURE 2, have a scale conductor $1b$ and cursor conductors $5b$ and $6b$, similar to the conductors $1$, $5$ and $6$ but having $\theta$ equal to $90°$ so that the cursor gives an output almost proportional to sidelash. Thus the output signals of the cursor conductors $5b$ and $6b$ represent cos Y and sin Y respectively, where Y represents the side lash in a direction perpendicular to the conductors of the scale $1b$. One cycle of variations of the side lash Y, that is 360° electrical degrees, corresponds to a displacement of $2p$ between the cursor conductors and the scale conductors. This signal can then be used to drive a servo-motor which displaces the cursor $3$ to annul the sidelash or alternatively to drive a common servo-motor which removes the effects by means of differentials after the output voltages of the displacement measuring device have been followed up. Sidelash indicated signal may also be used in other ways.

The invention is also applicable to measuring devices such as illustrated but modified for measuring angular displacement. In such modified devices the conductors $1$, $5$ and $6$ may be printed on discs or cylinders so that the successive conducting strips are angularly displaced about the axis of the relative displacement to be measured. In this case the direction of relative displacement of any point is regarded as normal to the radius through that point. Moreover in the case of the disc the obliquity of the strips of the conductors may be produced either by inclining the strips to a radial direction without bending them so that they are tangent to a common circle or by bending them to conform to sections of spirals or similar curves.

What we claim is:

1. A displacement measuring device comprising a scale having a series of conductive strips disposed side by side and connected for current flow in opposite directions in successive strips, a cursor mounted parallel and in proximity to said scale for relative displacement between said scale and said cursor in a predetermined direction, said cursor having at least one series of conductive strips substantially parallel to the strips on the scale and connected for current flow in opposite directions in successive strips, whereby electrical signals can be transferred from one series of strips to the other with an amplitude ratio responsive to relative displacement between the scale and the cursor in said direction, and wherein said conductive strips on both the scale and the cursor are similarly oblique to said direction.

2. A device according to claim 1, wherein said scale has a second series of conductive strips each with connections for current flow in opposite directions in successive strips, and equally and oppositely inclined as said first series of strips on the scale, and said cursor has a second series of conductive strips with substantially the same disposition relative to the second series of strips on the scale as the first series of strips on the cursor to the first series of strips on the scale, said first and second series of strips on the cursor being connected for the derivation of an output signal substantially insensitive to errors due to side lash of the cursor relative to the scale.

3. A device according to claim 1 wherein said scale has a further series of conductive strips disposed side by side and connected for current flow in opposite directions in successive strips, said further series of strips being substantially parallel to said direction of relative displacement and said cursor has a further series of strips connected for current flow in opposite directions in successive strips and substantially parallel to said direction, whereby an electrical signal can be transferred by electromagnetic induction from one of said further series of strips to the other with an amplitude ratio responsive substantially only to side lash of the cursor relative to the scale.

References Cited in the file of this patent

UNITED STATES PATENTS 2,799,835     Tripp _____ July 16, 1957

FOREIGN PATENTS 290,900     Italy _____ Dec. 2, 1931